S. A. COE.
Sheep-Rack.

No. 226,650. Patented April 20, 1880.

Witnesses:
Saml R. Turner
P. B. Pimpkin

Inventor:
Stephen A Coe
By R.S. & A.P. Lacey Atty's

UNITED STATES PATENT OFFICE.

STEPHEN A. COE, OF YATES CENTRE, NEW YORK.

SHEEP-RACK.

SPECIFICATION forming part of Letters Patent No. 226,650, dated April 20, 1880.

Application filed October 31, 1879.

*To all whom it may concern:*

Be it known that I, STEPHEN A. COE, of Yates Centre, in the county of Orleans and State of New York, have invented certain new and useful Improvements in Sheep-Racks; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to an improvement in sheep-racks; and it consists of a combined grain-trough and hay-rack, so arranged with reference to the rack that either of them may be alternately used by simply raising or lowering it on its hinges; and it further consists of a shut-off by means of which the sheep are kept from the food as desired, all of which will more fully hereinafter be set forth.

Figure 1:
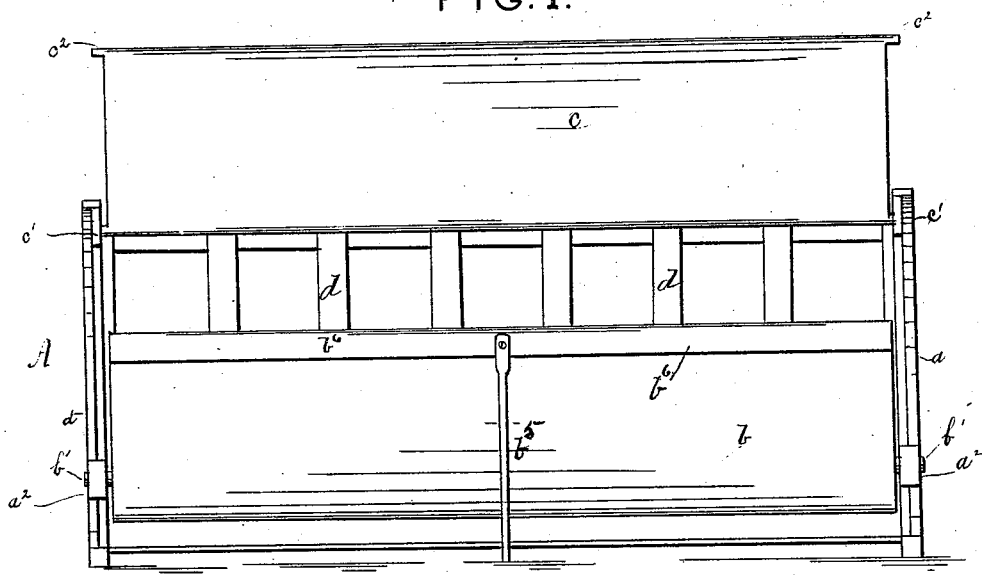
Figure 2:
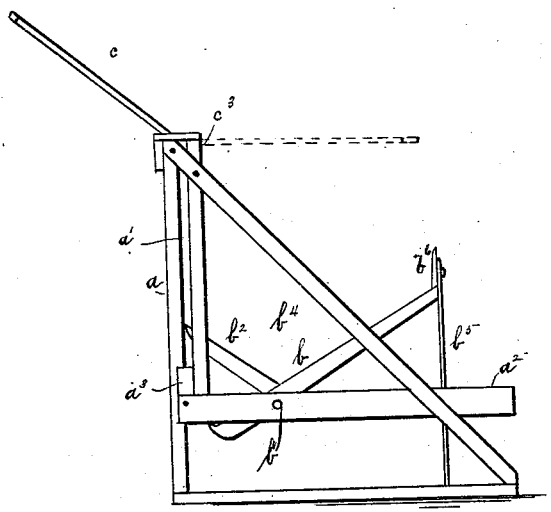
Figure 3:
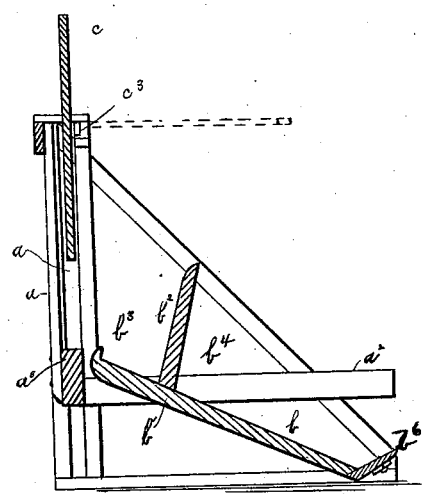

In the drawings, Figure 1 is a rear elevation of my invention. Fig. 2 is an end view of same, and Fig. 3 is a cross-section.

A is a frame in which the working mechanism of my invention is supported.

$a$ $a$ are the standards of the frame, arranged to provide slots or guideways $a'$, for the purposes hereinafter set forth.

$a^2$ $a^2$ are horizontal bars, to which the combined hay-rack and feed-trough is hinged.

$b$ is a back board, pivoted at the points $b'$ to the horizontal bars $a^2$, and sufficiently far from the inner edge of the frame that a feed-trough may be formed between them. It is in such relation to the frame A that its inner edge will be even with horizontal board $a^3$ when the outer end is let down, as shown in Fig. 3.

$b^2$ is a division-board crossing the entire length of the board $b$ along or near the line of the pivotal points, and is rigidly attached to it in nearly a perpendicular position, so as to form with the inner end of the said board $b$ a feed or grain trough, $b^3$, and with the outer end of the board $b$ a hay-rack, $b^4$. The said board $b^2$ is so arranged in relation to the frame A that when the outer end of the board $b$ is raised the top edge of $b^2$ will rest over the top of the horizontal board $a^3$, when the hay-rack $b^4$ will be in position for feeding, and the position of the board $b^2$, over the horizontal board $a^3$, will prevent hay from falling between them.

$b^5$ is a leg pivoted to the board $b$ to hold it in position when raised.

$b^6$ is a ledge-board secured at a suitable angle to the outer edge of the board $b$, and so arranged that it will prevent the hay from slipping off the said board $b$ when the latter is let down, as shown in Fig. 3.

$c$ is a shut-off or board designed to be placed in front of the trough so as to keep the sheep from it until it is desired to admit them to the food. It is provided with lugs $c'$, projecting horizontally from the lower corners of its ends, which fit and slide in the slots $a'$, and lugs $c^2$ on its upper ends, so that when the shut-off is down they suspend it by resting on the top of the standards $a$ $a$. When raised it may be turned back over the top of the frame and held in position by the lugs $c'$ against the top of the slots $a'$, as shown in Fig. 1, or it may be turned in front and held by any suitable means over and form a shelter for the hay, as shown by the dotted lines in Figs. 2 and 3.

In using my invention I let the board $b$ down when I wish to feed grain. This brings the trough $b^3$ in proper position for the sheep to get to it through the frame. To feed hay I raise the board $b$ and support it in position by the leg $b^5$. This motion automatically dumps or cleanses the trough $b^3$ of any refuse or unfit food that may be left. In like manner letting the board $b$ down cleanses the hay-rack of any refuse hay, or so nearly so that with a very slight assistance it is made perfectly clean.

The cut-off enables me to keep the sheep from the food until it is time to feed. By this means it may be prepared at any leisure moment or convenient time prior to feeding hours. It also serves as a protection for the hay from the weather when my rack is used in the open fields, as indicated by the dotted lines in Figs. 2 and 3.

In this device the hay is retained at all times on the board $b$ whether the latter be let down to open the feed-trough or raised to make a bin for said hay.

The board $b$ is a hinged platform on which the hay is held off the ground when let down, and by which the hay is again lifted into position to be reached by the sheep.

The partition-board stands with its edge against the vertical slats $d$ when the rack is used for feeding hay. When grain is to be fed the board $b$ is let down, as shown in Fig. 3. The partition-board also turns back and draws all hay remaining in the rack away from the slats $d$, so as to leave the grain-trough clear. When thus let down the hay is held off the ground, and when the board is lifted into position, as shown in Fig. 2, the hay is carried back to where it can be reached by the sheep.

It is not necessary to remove any hay from the rack in order to permit the grain-trough to be turned into position for use.

I am aware that sheep-racks have been made and provided with boards which serve the double purpose of roofs for the rack and as shut-offs against the sheep, some of said boards being hinged so that they turn down on the front side of the rack, others that turn down into the rack, and again others wherein the shut-off is sloped by the hand into lugs or other retaining means formed on the outer side. In all of these cases the boards may be turned or slipped up over the top and form a roof for the rack. I do not claim these constructions.

Having described my invention, what I claim, and desire to secure by Letters Patent, is—

1. In a sheep-rack, the combination of the board $b$, having the ledge $b^6$, and provided on its ends with supporting-pins $b'$, arranged intermediately between the edges of its opposite sides, the partition-board $b^2$, fixed to and along the axial line or center of motion of the board $b$, and the frame A, all constructed and arranged to operate substantially as and for the purposes set forth.

2. The combination, with the frame A, provided with the standards $a$, having guideways $a'$, and arranged on the front side of said frame A, of the shut-off $c$, provided with the lugs $c'$, projecting horizontally from its lower corners, and the lugs $c^2$, projecting horizontally from its upper corners, substantially as and for the purposes set forth.

In testimony that I claim the foregoing as my own I affix my signature in presence of two witnesses.

STEPHEN A. COE.

Witnesses:
 TUNIS H. COE,
 FRANK L. COE.